March 11, 1952   P. A. DROUIN   2,588,619
ELECTROMAGNETIC COMPASS
Filed Oct. 5, 1948
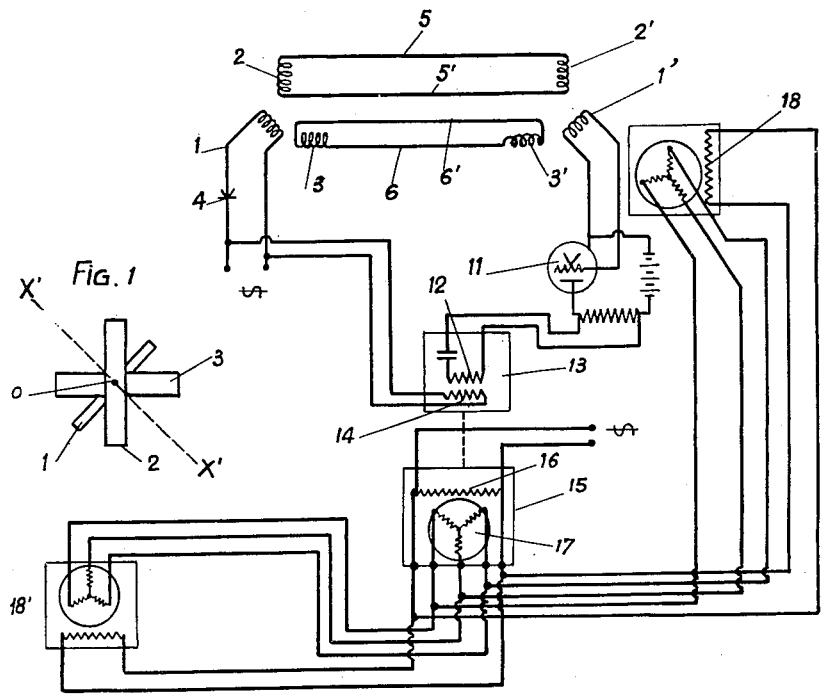
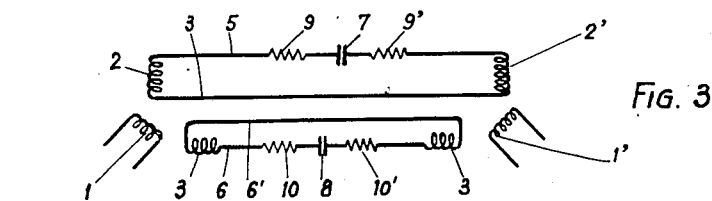
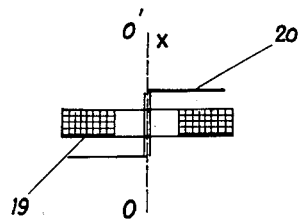
Inventor
Pierre Andre Drouin
By Robert E. Burns
Attorney Patented Mar. 11, 1952

2,588,619

UNITED STATES PATENT OFFICE 2,588,619

ELECTROMAGNETIC COMPASS

Pierre André Drouin, Paris, France

Application October 5, 1948, Serial No. 52,855
In France October 13, 1947

8 Claims. (Cl. 33—222)

The present invention relates to an electromagnetic compass for ships, including a movable part which can be directed under the action of the earth magnetic field, just like an ordinary magnetic compass.

Compasses of the latter type may be adapted only with much difficulty, by means of very delicate and not reliable devices, to the remote control of their indications, which prevents getting the same indications of the steered course in several places of the ship simultaneously, which is very desirable.

This drawback is not inherent to the gyroscopic compasses which can be easily adapted to the remote transmission of their indications, but these compasses are very expensive, they include relatively quickly-worn parts and are subject to certain errors.

The first object of the invention is a compass giving the same indications as a magnetic compass, that is to say indicating the magnetic north, but directly allowing the remote transmission of their indications.

Another object of the present invention is an electromagnetic compass wherein the movable part directed by the action of the earth magnetic field is provided with means for generating a periodical and unidirectional magnetic field rotating with said movable part.

The movable part directed by the earth field is constituted by an electromagnetic system fed by an undulated current which, for example, can be produced by rectifying only one alternation of an ordinary alternating current.

In these conditions, the non null average component of the undulated current calls forth a predominant magnetization of the movable system along a certain direction in such a way that this system is directed by the earth field just as a steel magnet would do, on the only condition that the period of the undulated current be very small compared with the oscillation period of the system, while the alternating component is used to supply induction effects, which vary together with the azimuth of the movable system, and which serve to transmit the indications of steered course.

The movable part of the compass thus receives a magnetization due to a periodically variable magnetic field, having a non null mean intensity and can be directed under the action of the earth magnetic field like an ordinary magnet and induce in fixed coils currents which give the possibility of transmitting the indications of the compass to a remote receiver.

Another peculiarity must be underlined: the fixed excited coils in which currents are induced by the undulated magnetic field bound to the movable member, have no iron core, and therefore there is no risk of introducing any trouble into the earth field which directs the movable part.

The movable part of the compass can be constituted for example, either by a horizontal axis coil freely rotating around a vertical shaft and fed with single-phase current one phase only of which has been rectified, or by a fixed coil having a vertical axis and fed in the same manner as above having inside a movable iron core rotating around the vertical axis of the coil.

Owing to these particulars, the compass, object of this invention can be mounted on the ship in any place which cannot be directly observed and as far as possible from the magnetic or magnetized masses of the hull, for example at the top of a mast, which tends to increase the accuracy of its indications.

As examples, two embodiments of the compass according to the invention have been described above and represented on the annexed wiring diagram.

Figure 1 diagrammatically shows in a horizontal view the movable coil compass with the fixed excited coils used for the remote transmission.

Figure 2 diagrammatically shows the whole equipment including a directing compass, a master repeater and secondary repeaters.

Figure 3 shows a modification of a part of the equipment of the Figure 2.

Figure 4 diagrammatically shows a section in a vertical plane of a compass comprising fixed coils and a movable iron core.

As shown in Figure 1, the orientable or directing member of the compass is constituted by a coil 1 having a horizontal axis, which can freely rotate around a vertical shaft 0 under the action of the horizontal component of the earth magnetic field and which is fed by an alternating current of which only one alternation has been rectified and the frequency of which is preferably from 300 to 500 cycles. The directing coil 1 induces currents in two fixed coils or frames 2, 3, arranged at right angles, these currents being transmitted to a remote receiver which allows a magnetic field to be reproduced the direction of which depends upon that of the directing member 1.

As shown in Figure 2, the whole equipment includes an alternating current generator of suitable frequency feeding the directing coil 1 of the compass through a rectifier 4.

The transmitting unit constituted by the movable coil 1 and the fixed coils 2, 3, is connected to a remote master repeater constituted exactly like the transmitter by two fixed coils arranged at right angles 2', 3' and a movable coil 1'. The coils 2', 3' of the repeater are respectively fed by the coils 2, 3, of the transmitter, either simply by wires 5, 5' and 6, 6' (Fig. 2), or with tuning condensers 7, 8 and damping resistances 9, 9', 10, 10', (Fig. 3) inserted in said wires.

The repeater fixed coils are arranged in such a way that the resultant field which they generate is always perpendicular to the axis of the winding of the directing member 1; in this condition when the repeater movable coil 1' is parallel to the compass directing coil 1, the current induced in the coil 1' is null and the phase of this current is reversed when passing through this position, which makes it possible to drive this coil 1' by a reversible electrical motor fed by the induced current of this coil so as to oblige the latter to remain always parallel to the coil 1 of the directing compass. To this end, the induced current of the coil 1' feeds, through an amplifier 11, one of the windings 12 of a reversible electrical motor 13, of which the other winding is fed by the current of the source supplying the coil 1. Therefore this motor 14 begins to rotate as soon as the coil 1' makes an angle with the coil 1, and drives back this coil 1' to the position in which the induced current is null, that is to say in the position in which the coil 1' is parallel to the coil 1. The motor 14 drives, preferably through a speed reducer (not shown), the transmitter of a remote control device; the master repeater coil 1' shaft is controlled by the receiver of this remote control device, while other receivers operate any number of secondary repeaters dispersed throughout the ship.

This remote control device can be constituted for example by a connection well known as "selsyn," consisting of a transmitter 15 which includes a stator 16 fed by single phase current, a three-phase rotor 17, and receivers such as 18, 18' entirely identical with the transmitter, the windings of the stators and rotors of these receivers being connected to the transmitter stator and rotor windings 15.

One of these receivers 18 controls the shaft of the movable coil 1' of the master repeater, while the other receivers such as 18' control the secondary repeaters.

It is possible, of course, to use instead of a reversible motor, any electrical motor of which the direction of rotation is controlled by a phase relay fed by the current induced in the movable coil 1' of the repeater.

The second embodiment of the compass, according to the present invention, is shown in Figure 4; it enables to avoid the delicate connection between a source of current and a movable winding, these connections being designed so as to eliminate the friction by using liquid contacts, preferably mercury. For this purpose, the compass comprises fixed coil 19 having a vertical axis and fed as previously described by a single-phase current of which only one alternation has been rectified, and a soft iron part 20 forming the only movable part of the compass, and which can freely rotate around the axis of coil 19. This part 20 thus receives from the coil 19 a periodically interrupted magnetization but always of the same direction, and of a non null average value, so that member 20 is directed by the earth field like a magnetized needle and is able in the same time, owing to the periodical changes of the magnetization, to induce in fixed coils such as 2, 3 (Fig. 1) currents of which the relative intensities depend upon the angular position of the part 20.

The master repeater controlled by this compass 19—20 may also comprise a fixed coil and a movable iron core, or only a movable coil like that of the Fig. 2; indeed, since the movable part of the repeater is driven by the control motor, the friction of the movable contacts has not a great importance and these contacts can be realized as usually by means of slip rings and brushes.

It must be noted that, except for the directing compass and the master repeater, the equipment represented in Figure 2 is identical, as far as the transmission to the secondary repeaters is concerned, with that used with gyroscopic compasses, so that the latter can easily be supplemented on a ship by an electromagnetic compass according to the present invention, a commutator being provided for controlling the secondary repeaters by the one or by the other of both said compasses.

What I claim is:

1. Electromagnetic compass comprising a movable member directed by the earth magnetic field and formed by a coil having a horizontal axis and freely pivoted on a vertical axis, and means for supplying said coil with a cyclically varying unidirectional current.

2. Electromagnetic compass comprising a movable member directed by the earth magnetic field and formed by a coil having a horizontal axis and freely pivoted on a vertical axis, and means for supplying said coil with a single phase alternating current of which one alternation has been previously suppressed.

3. Electromagnetic compass comprising a movable member directed by the earth magnetic field and formed by a coil having a horizontal axis and freely pivoted on a vertical axis, and means for supplying said coil with a single phase alternating current of which one alternation has been previously suppressed, two fixed coils having horizontal axes at right angles the one with respect to the other, said fixed coils being located in the unidirectional periodically interrupted magnetic field generated by the movable coil, means to transmit to a distance the currents induced in both fixed coils by the movable coil and means to receive said currents so as to reproduce a magnetic field the direction of which is bound to that of said movable coil.

4. An electromagnetic compass equipment including a transmitter compass comprising a movable member directed by the earth magnetic field and formed by a coil having a horizontal axis and freely pivoted on a vertical axis, means for supplying said coil with a single phase current of which one alternation has been previously suppressed, two fixed coils having horizontal axes at right angles the one with respect to the other, said fixed coils being located in the unidirectional periodically interrupted magnetic field generated by the movable coil, a remote repeater compass comprising a movable coil and two fixed coils identically similar to those of the transmitter compass respectively, wire connections provided between each of the fixed coils of the transmitter and the corresponding fixed coil of the repeater, the said fixed coils of the repeater being arranged so that the resultant field generated by these coils is at any moment perpendicular to the direction of the movable coil of the transmitter, means to control the movable coil of the repeater and to maintain it in a direction in which the current induced in said coil is equal to zero.

5. Electromagnetic compass comprising a movable member directed by the earth magnetic field and formed by an iron core having a vertically arranged median part, freely pivoted about a vertical axis and provided with end portions projecting horizontally in opposite directions, a fixed coil surrounding said median part, and means for supplying to said coil a cyclically varying unidirectional current.

6. An electromagnetic compass comprising magnetizable means including a coil for developing a field within said means, said means being arranged to direct said field in a generally horizontal direction; means connected to supply to said coil a cyclically varying unidirectional current; and a support in which at least a part of said magnetizable means in which said field is developed is freely pivoted for rotation about a vertical axis under the action of the earth's magnetic field.

7. An electromagnetic compass comprising magnetizable means including a coil for developing a field within said means, said means being arranged to direct said field in a generally horizontal direction; means connected to supply to said coil a cyclically varying unidirectional current; a support in which at least a part of said magnetizable means in which said field is developed is freely pivoted for rotation about a vertical axis under the action of the earth's magnetic field; and fixed coils with mutually inclined axes mounted within the field of said magnetizable means, whereby currents are induced in said fixed coils the intensity of which depends upon the angular position of said part.

8. An electromagnetic compass comprising magnetizable means including a coil for developing a field within said means, said means being arranged to direct said field in a generally horizontal direction; means connected to supply to said coil a cyclically varying unidirectional current; a support in which at least a part of said magnetizable means in which said field is developed is freely pivoted for rotation about a vertical axis under the action of the earth's magnetic field; two fixed coils having substantially horizontal axes at right angles the one with respect to the other wherein currents are induced the intensity of which depends upon the direction of said part; and means for the remote transmission of said currents so as to reproduce a magnetic field the direction of which is bound to that of said part.

PIERRE ANDRÉ DROUIN.

REFERENCES CITED

The following references are of record in the file of this patent:

UNITED STATES PATENTS

| Number | Name | Date |
| --- | --- | --- |
| 1,746,420 | Fung | Feb. 11, 1930 |
| 2,047,609 | Antranikian | July 14, 1936 |
| 2,308,566 | Noxon | Jan. 19, 1943 |
| 2,316,873 | Kollsman | Apr. 20, 1943 |
| 2,342,637 | Bechberger | Feb. 29, 1944 |
| 2,439,701 | Stuart | Apr. 13, 1948 |